US010556528B2

(12) United States Patent
Ninagawa

(10) Patent No.: US 10,556,528 B2
(45) Date of Patent: Feb. 11, 2020

(54) CUSHION FRAME

(71) Applicant: TOYOTA BOSHOKU KABUSHIKI KAISHA, Aichi (JP)

(72) Inventor: Atsushi Ninagawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/167,025

(22) Filed: Oct. 22, 2018

(65) Prior Publication Data

US 2019/0118686 A1 Apr. 25, 2019

(30) Foreign Application Priority Data

Oct. 24, 2017 (JP) ................................. 2017-205225

(51) Int. Cl.
*B60N 2/005* (2006.01)
*B60N 2/42* (2006.01)
*B60N 2/68* (2006.01)
*B60N 2/06* (2006.01)

(52) U.S. Cl.
CPC ................ *B60N 2/682* (2013.01); *B60N 2/06* (2013.01)

(58) Field of Classification Search
CPC .................................. B60N 2/06; B60N 2/682
USPC ............. 297/216.1, 216.14, 216.15, 216.16, 297/216.18, 219.19, 216.2, 344.15, 297/344.16, 344.17, 452.18, 452.19, 297/452.2, 463.1, 463.2
See application file for complete search history.

(56) References Cited

U.S. PATENT DOCUMENTS

| | | | | |
|---|---|---|---|---|
| 4,973,105 A * | 11/1990 | Itou | ........................ | B60N 2/161 297/463.1 X |
| 5,507,552 A * | 4/1996 | Ineich | ................... | B60N 2/0232 297/216.1 X |
| 6,502,798 B1 * | 1/2003 | Frohnhaus | ........... | B60N 2/1615 297/344.15 X |
| 7,278,686 B2 * | 10/2007 | Yoshida | ............... | B60N 2/1615 297/344.15 X |
| 7,316,454 B2 * | 1/2008 | Yoshida | ............... | B60N 2/1615 297/344.14 |
| 8,172,326 B2 * | 5/2012 | Adragna | ............... | B60N 2/1615 297/344.15 |
| 8,408,654 B2 * | 4/2013 | Jones | .................... | B60N 2/1803 297/216.1 |

(Continued)

FOREIGN PATENT DOCUMENTS

JP 2015-209074 11/2015

*Primary Examiner* — Rodney B White
(74) *Attorney, Agent, or Firm* — Greenblum & Bernstein, P.L.C.

(57) ABSTRACT

A cushion frame for use in a vehicle seat includes a side frame extending in a seat front-rear direction, a bracket supporting the side frame and a coupling member. The bracket includes a lower end portion having a fixing portion fixed to a vehicle directly or indirectly. The coupling member is fixed to an upper end portion of the bracket to hold the upper end portion at a position offset in a seat width direction relative to the side frame and to fix the upper end portion to the side frame. A welding region of the coupling member, projected on a virtual plane orthogonal to the seat width direction, extends along an outer periphery of the coupling member in a specified area including an intersection between the outer periphery of the coupling member projected on the virtual plane and a bracket normal line.

15 Claims, 7 Drawing Sheets

(56) References Cited

U.S. PATENT DOCUMENTS

| | | | |
|---|---|---|---|
| 9,637,036 B2 | 5/2017 | Shinozaki | |
| 10,471,855 B2* | 11/2019 | Niwa | B60N 2/0732 |
| 2007/0194613 A1* | 8/2007 | Kojima | B60N 2/0705 |
| | | | 297/344.15 |
| 2011/0133538 A1* | 6/2011 | Adragna | B60N 2/1615 |
| | | | 297/452.18 |
| 2014/0077554 A1* | 3/2014 | Fujioka | B60N 2/067 |
| | | | 297/313 |
| 2014/0183918 A1* | 7/2014 | Kaku | B60N 2/002 |
| | | | 297/344.15 |
| 2014/0265470 A1* | 9/2014 | Suzuki | B60N 2/1615 |
| | | | 297/216.1 |
| 2015/0097404 A1* | 4/2015 | Furuta | B60N 2/68 |
| | | | 297/344.15 |
| 2015/0239370 A1* | 8/2015 | Hoshi | B60N 2/682 |
| | | | 297/344.15 |
| 2015/0307009 A1 | 10/2015 | Shinozaki | |
| 2015/0336477 A1* | 11/2015 | Matsui | B60N 2/682 |
| | | | 297/344.15 |
| 2017/0067761 A1* | 3/2017 | Kito | G01D 11/30 |
| 2018/0222356 A1* | 8/2018 | Ishihara | B60N 2/54 |
| 2018/0354393 A1* | 12/2018 | Mizobata | B60N 2/2352 |

* cited by examiner

CUSHION FRAME

CROSS-REFERENCE TO RELATED APPLICATIONS

This application claims the benefit of Japanese Patent Application No. 2017-205225 filed on Oct. 24, 2017 with the Japan Patent Office, the entire disclosure of which is incorporated herein by reference.

BACKGROUND

The present disclosure relates to a cushion frame for use in a vehicle seat.

For example, in a cushion frame described in Japanese Unexamined Patent Application Publication No. 2015-209074, a side frame (also referred to as a "lower arm") and a bracket are fixed together in a state where a flat-plate portion of the side frame and a flat-plate portion of the bracket are stacked each other in a seat width direction and welded and fixed.

The bracket is a member to fix the cushion frame, and thus the side frame, to a vehicle. Therefore, a lower end portion of the bracket is directly or indirectly fixed to the vehicle. That is, the cushion frame is fixed to the vehicle via the bracket.

SUMMARY

When a large load in a seat front-rear direction is applied on the side frame, stress concentration may occur at a mutual joining area of the bracket and the side frame.

In light of the above, the present disclosure provides a cushion frame that can reduce such stress concentration.

The cushion frame preferably comprises: a side frame extending in a seat front-rear direction, a bracket supporting the side frame and comprising a lower end portion having a fixing portion to be fixed to a vehicle directly or indirectly, and a coupling member fixed to an upper end portion of the bracket and configured to hold the upper end portion at a position offset in a seat width direction relative to the side frame and to fix the upper end portion to the side frame.

With such configuration, if a load in the seat front-rear direction (hereinafter, a "front-rear load") is applied to the side frame, a load (hereinafter referred to as a "parallel load") parallel to the front-rear load is applied to the upper end portion of the bracket through the coupling member, and also a moment (rotational force) to twist the bracket is applied to the upper end portion of the bracket through the coupling member.

At least a part of energy of the load applied to the side frame is absorbed, for example, in the form of deformation of the bracket due to the parallel load, deformation of the bracket due to the moment, and the like.

In other words, at least a part of the energy of the load applied to the side frame may be absorbed by the bracket through a plurality of deformation modes. Accordingly, the energy of the load applied to the side frame can be inhibited from concentrating on a specific area, and thus, stress concentration mentioned above can be reduced.

The aforementioned moment is a moment (rotational force) that twists the bracket, and thus, a deformation mode that can cause coming off of the coupling member from the bracket and the side frame can occur.

In this regard, it is preferable that a welding region of the coupling member, projected on a virtual plane orthogonal to the seat width direction, extend along an outer periphery of the coupling member in a specified area including an intersection between the outer periphery of the coupling member projected on the virtual plane and a bracket normal line.

The moment that twists the bracket generally creates a rotational force around a bracket center line. Thus, the welding region provided in the specified area can achieve a joining structure that may effectively resist the deformation mode.

The bracket normal line is a normal line of a bracket center line and passes through a center of the coupling member projected on the virtual plane. The bracket center line is a virtual line that passes through a center of the fixing portion projected on the virtual plane and through the center of the coupling member projected on the virtual plane.

In a case where the bracket is fixed with one or more bolts, the center of the fixing portion means a point at which the sum of moments caused by axial forces generated in the one or more bolts is zero.

For example, if the bracket is fixed with one bolt, a center of the bolt is the center of the fixing portion. For example, if the bracket is fixed with two bolts, then the center of the fixing portion is a point bisecting the distance between the respective centers of the two bolts.

The welding region of the cushion frame is intended to mean at least one of a welding region between the coupling member and the bracket (hereinafter referred to as a "bracket welding region" or a welding region between the coupling member and the side frame (hereinafter referred to as a "frame welding region").

The cushion frame may comprise one of the following configurations (a) to (e):

(a) A configuration in which the bracket welding region and the frame welding region are provided in the specified area.

(b) A configuration in which the bracket welding region or the frame welding region is provided in the specified area.

(c) A configuration in which the coupling member is formed integrally with the bracket or the side frame.

(d) A configuration in which the coupling member is fixed directly to at least one of the bracket or the side frame in one of (a) to (c) above.

(e) A configuration in which the coupling member is fixed indirectly to at least one of the bracket or the side frame in one of (a) to (c) above.

The cushion frame may be configured as described below.

The fixing portion preferably comprises a member having a through hole through which a fixing bolt is inserted or comprises a fixing bolt. This allows rotation of the entire bracket when a moment twisting the bracket is applied. Accordingly, an excessive increase in torsional stress due to the moment can be inhibited The welding region is a region to be welded to fix the coupling member to the bracket, and the welding region is preferably provided on an opposite side of the bracket relative to the side frame. This can improve welding workability.

BRIEF DESCRIPTION OF THE DRAWINGS

Several embodiments of the present disclosure will be described hereinafter by way of example with reference to the accompanying drawings, in which.

DETAILED DESCRIPTION OF THE PREFERRED EMBODIMENTS

Figure 1:
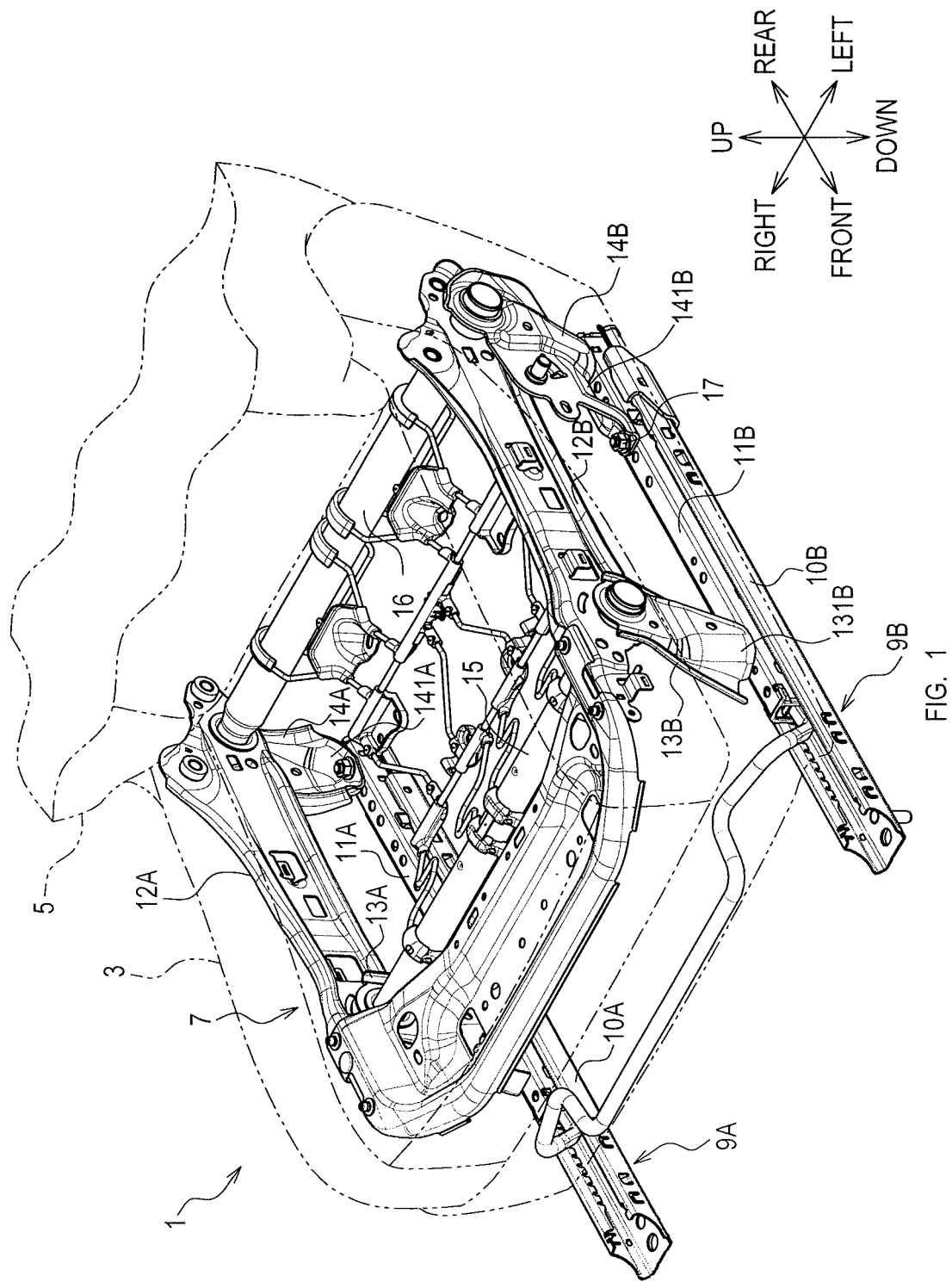
FIG. 1 is a perspective view transparently showing a cushion frame of a first embodiment.

Hereinafter, some example embodiments within the technical scope of the present disclosure will be described. Matters specifying the invention recited in appended claims should not be limited to any specific configuration, structure, or the like, described in the embodiments below.

At least one member or portion is provided if it is described and explained with a reference numeral unless there is a specifying term, such as "only one". In other words, two or more members may be provided unless there is a specifying term, such as "only one".

Arrows and other marks indicating directions shown in the figures are provided for the purpose of easy understanding of mutual relationships of the figures. The present disclosure is not limited to the directions shown in the figures. Each direction means a direction in a state where a vehicle seat in the embodiments is assembled to a vehicle.

First Embodiment

1. Overview of Vehicle Seat

In a first embodiment, one example of a cushion frame of the present disclosure is applied to a vehicle seat. FIG. 1 shows a vehicle seat 1 that comprises at least a seat cushion 3 and a seatback 5.

The seat cushion 3 supports an occupant's buttocks. The seatback 5 supports an occupant's back. A cushion frame 7 forms a framework of the seat cushion 3.

The cushion frame 7 is fixed to a floor panel of a vehicle (for example, an automobile) through a right sliding device 9A and a left sliding device 9B. The right sliding device 9A and the left sliding device 9B support the cushion frame 7 to be slidable along a seat front-rear direction.

The right sliding device 9A comprises at least a right fixed rail 10A and a right movable rail 11A. The left sliding device 9B comprises at least a left fixed rail 10B and a left movable rail 11B. The right fixed rail 10A and the left fixed rail 10B are each fixed to the floor panel. The right movable rail 11A is slidable relative to the right fixed rail 10A. The left movable rail 11B is slidable relative to the left fixed rail 10B.

The cushion frame 7 comprises a first end (a right end in the first embodiment) along a seat width direction that is fixed to the right movable rail 11A of the right sliding device 9A. The cushion frame 7 comprises a second end (a left end in the first embodiment) along the seat width direction that is fixed to the left movable rail 11B of the left sliding device 9B. This allows the vehicle seat 1 to be slidingly movable relative to the vehicle along the seat front-rear direction.

2. Configuration of Cushion Frame

2.1 Overview of Cushion Frame

The cushion frame 7 comprises at least two side frames, including a right side frame 12A and a left side frame 12B, and at least a plurality of brackets, including a right front bracket 13A, a right rear bracket 14A, a left front bracket 13B, and a left rear bracket 14B.

The right side frame 12A is arranged on a first side of the seat along the seat width direction (on a right side in the first embodiment) and extends along the seat front-rear direction. The left side frame 12B is arranged on a second side of the seat along the seat width direction (on a left side in the first embodiment) and extends along the seat front-rear direction. The right side frame 12A and the left side frame 12B are each formed by pressing working of a metal plate material, such as SPCC and SPHC.

The right side frame 12A and the left side frame 12B are coupled to each other by a front coupling rod 15 and a rear coupling rod 16 extending along the seat width direction. The front coupling rod 15 couples a seat front end of the right side frame 12A to a seat front end of the left side frame 12B. The rear coupling rod 16 couples a seat rear end of the right side frame 12A to a seat rear end of the left side frame 12B.

Figure 2:
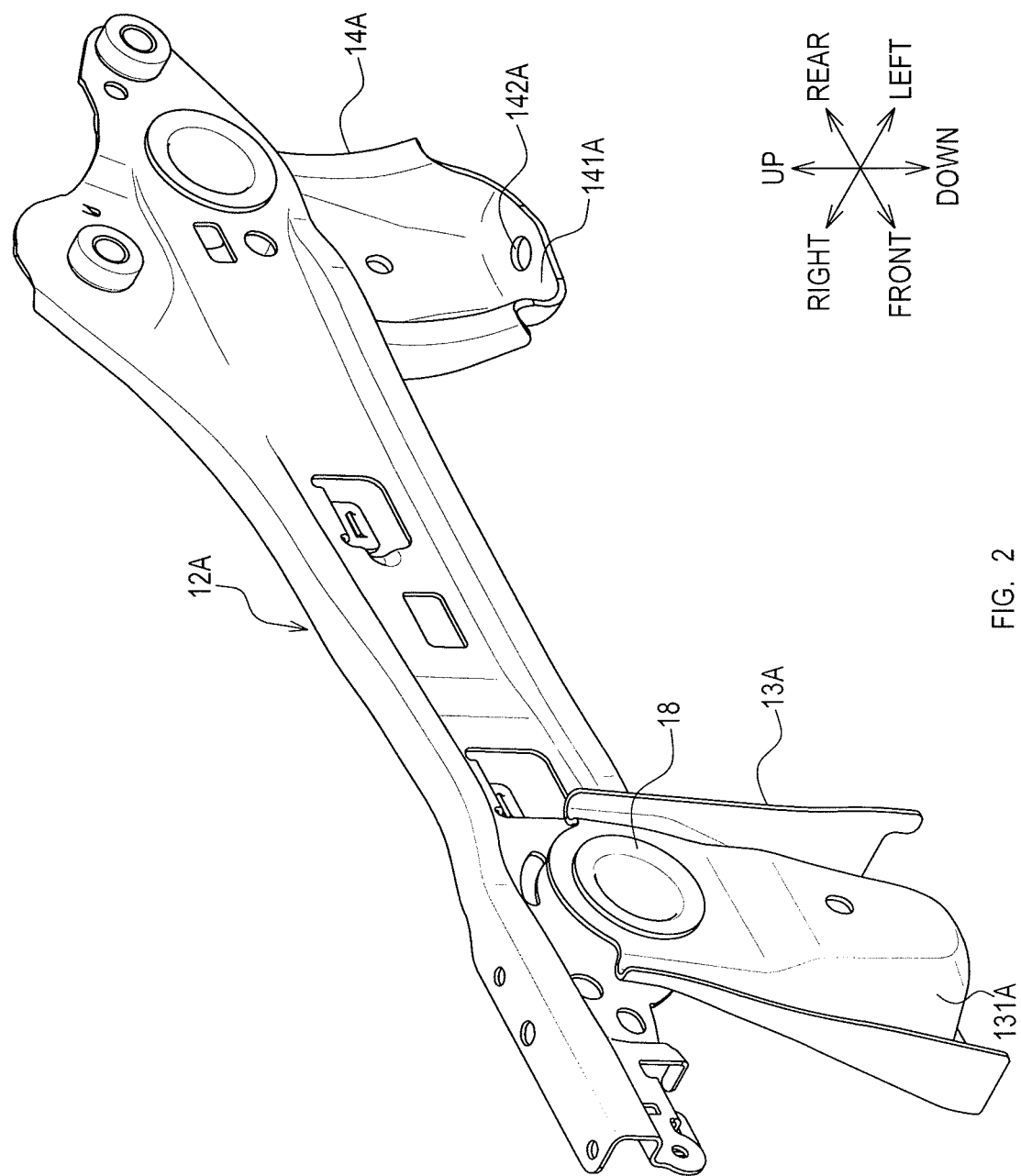
FIG. 2 is perspective view showing a coupling state of a right side frame with a right front bracket and a right rear bracket in the first embodiment.

As shown in FIG. 2, at least two brackets, including the right front bracket 13A and the right rear bracket 14A, are coupled to the right side frame 12A. Respective upper end portions of the right front bracket 13A and the right rear bracket 14A are fixed to the right side frame 12A. Respective lower end portions of the right front bracket 13A and the right rear bracket 14A are fixed to the right movable rail 11A. Similarly, as shown in FIG. 1, at least two brackets, including the left front bracket 13B and the left rear bracket 14B, are coupled to the left side frame 12B. Respective upper end portions of the left front bracket 13B and the left rear bracket 14B are fixed to the left side frame 12B. Respective lower end portions of the left front bracket 13B and the left rear bracket 14B are fixed to the left movable rail 11B.

The right front bracket 13A and the right rear bracket 14A that are coupled to the right side frame 12A support the right side frame 12A. The left front bracket 13B and the left rear bracket 14B that are coupled to the left side frame 12B support the left side frame 12B. As a result, the vehicle seat 1 is fixed to the right sliding device 9A and the left sliding device 9B through the brackets 13A, 13B, 14A, 14B.

Figure 4:
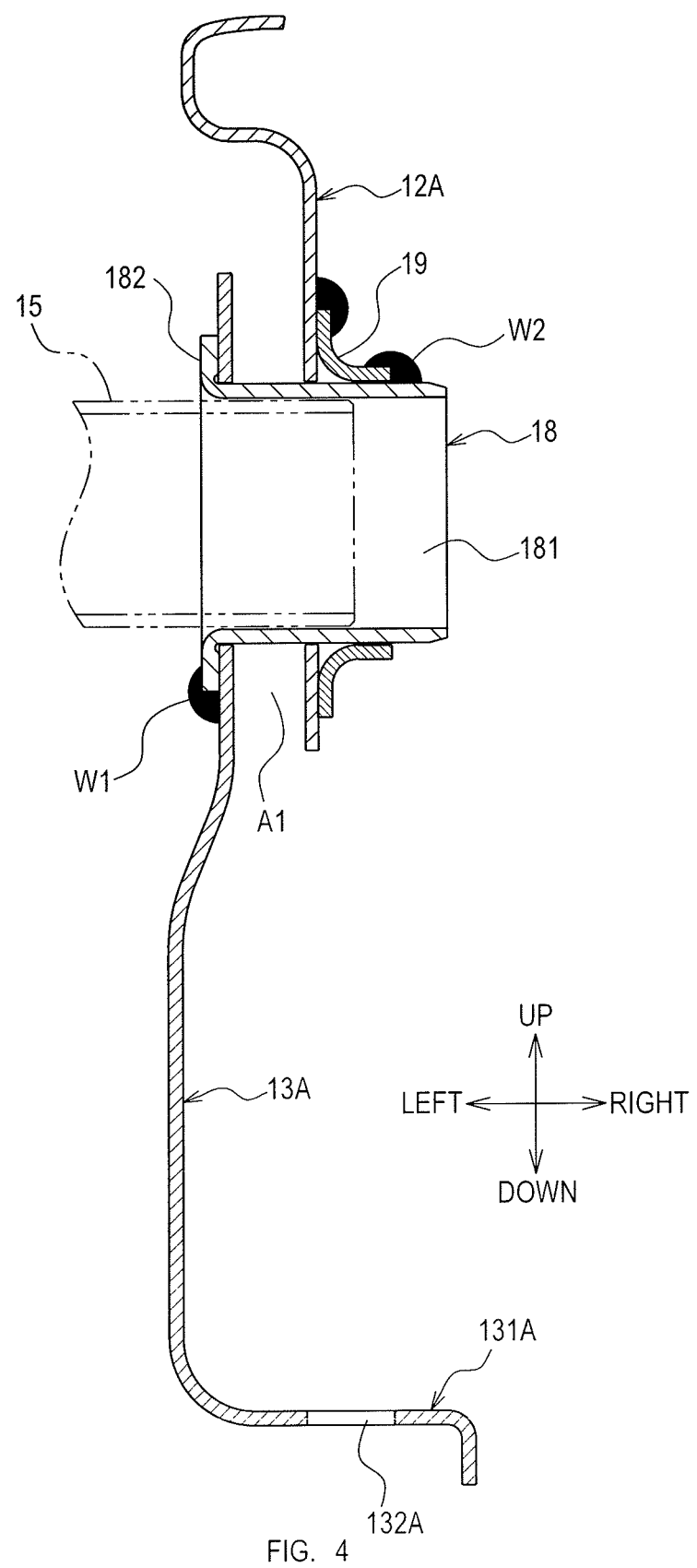
FIG. 4 is sectional view showing a coupling state of the right side frame and the right front bracket in the first embodiment.

As shown in FIG. 1, the left front bracket 13B comprises, at its lower end, a left front fixing portion 131B to be fixed to the left movable rail 11B, and the left rear bracket 14B comprises, at its lower end, a left rear fixing portion 141B to be fixed to the left movable rail 11B. Similarly, in FIG. 2, the right front bracket 13A comprises, at its lower end, a right front fixing portion 131A to be fixed to the right movable rail 11A, and in FIGS. 1 and 2, the right rear bracket 14A comprises, at its lower end, a right rear fixing portion 141A to be fixed to the right movable rail 11A. In FIG. 4, the right front fixing portion 131A comprises at least one through hole 132A through which a fixing bolt is inserted. In FIG. 2, the right rear fixing portion 141A comprises at least one through hole 142A through which a fixing bolt is inserted. Similarly, the left front fixing portion 131B and the left rear fixing portion 141B each comprise at least one through hole through which a fixing bolt is inserted.

The right front fixing portion 131A of the right front bracket 13A in the first embodiment comprises one through hole 132A. The right rear fixing portion 141A of the right rear bracket 14A in the first embodiment comprises one through hole 142A. The left front fixing portion 131B of the left front bracket 13B and the left rear fixing portion 141B of the left rear bracket 14B each comprise a through hole. Respective fixing bolts to fix the right front fixing portion 131A and the right rear fixing portion 141A are welded and fixed to the right movable rail 11A. Respective fixing bolts to fix the left front fixing portion 131B and the left rear fixing portion 141B are welded and fixed to the left movable rail 11B. Thus, no female thread is formed in the through hole 132A of the right front fixing portion 131A, the through hole 142A of the right rear fixing portion 141A, the through hole of the left front fixing portion 131B, or the through hole of the left rear fixing portion 141B. A nut 17 is fastened to each of the fixing bolts (see FIG. 1).

2.2 Coupling Structure Between Side Frame and Bracket

<Overview of Coupling Structure>

A description below of the right front bracket 13A or a part thereof may be applied similarly to each of the right rear bracket 14A, the left front bracket 13B, the left rear bracket 14B, or a part thereof, with necessary modifications made.

Also, a description below of the right side frame 12A or a part thereof may be applied similarly to the left side frame 12B or a part thereof, with necessary modifications made.

A coupling structure on the first side of the seat along the seat width direction (on the right side in the first embodiment) and a coupling structure on the second side of the seat along the seat width direction (on the left side in the first embodiment) are substantially the same. Hereinafter, a description will be given, as an example, of a coupling structure between the right side frame 12A arranged on the first side of the seat along the seat width direction and the right front bracket 13A arranged at a seat front end portion of the right side frame 12A. The coupling structure described below is not limitedly applied to the coupling structure between the right front bracket 13A of the right side frame 12A and the right side frame 12A, but may be applied, for example, to a coupling structure between the right rear bracket 14A of the right side frame 12A and the right side frame 12A, to a coupling structure between the left front bracket 13B of the left side frame 12B and the left side frame 12B, and to a coupling structure between the left rear bracket 14B of the left side frame 12B and the left side frame 12B.

Figure 3:
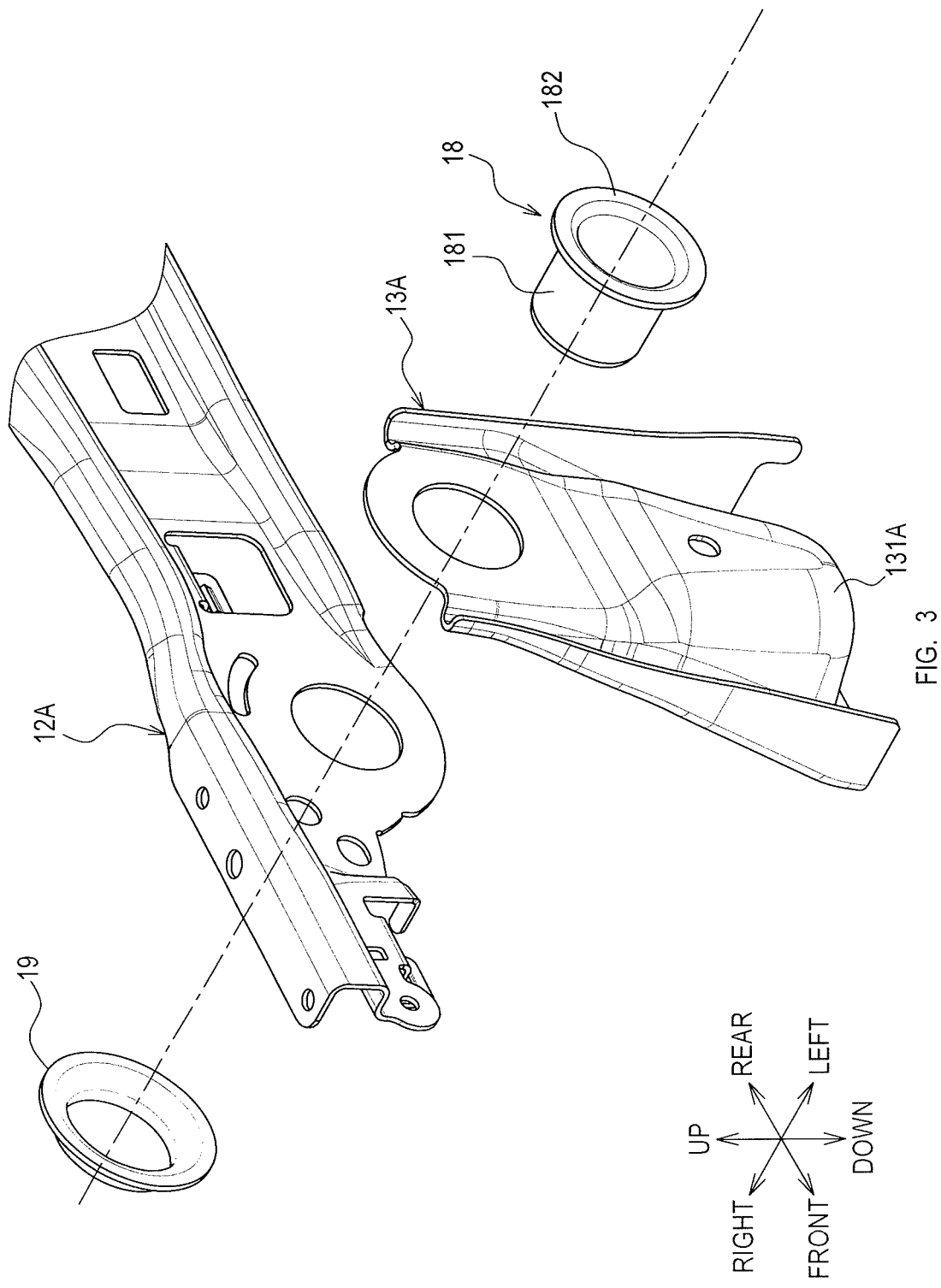
FIG. 3 is an exploded perspective view showing a coupling state of the right side frame and the right front bracket in the first embodiment.

As shown in FIG. 3 and FIG. 4, the right side frame 12A and the upper end portion of the right front bracket 13A are coupled together through a coupling member 18. Specifically, one end of the coupling member 18 (a right end in FIG. 4) is indirectly welded and fixed to the right side frame 12A through a flange 19. The other end of the coupling member 18 (a left end in FIG. 4) is directly welded and fixed to the right front bracket 13A.

As shown in FIG. 4, the coupling member 18 is fixed to the upper end portion of the right front bracket 13A. Also, the coupling member 18 fixes the upper end portion of the right front bracket 13A to the right side frame 12A in a state of holding the upper end portion of the right front bracket 13A at a position offset in the seat width direction relative to the right side frame 12A.

The coupling member 18 of the first embodiment comprises a cylindrical portion 181 having a cylindrical shape and a ring-shaped flange portion 182. The flange portion 182 protrudes radially from one end (a left end in FIG. 4) of the cylindrical portion 181 along an entire circumference of the cylindrical portion 181. The flange portion 182 is integrally formed with the cylindrical portion 181 by plastic forming of a metal pipe material that configures the cylindrical portion 181.

The flange portion 182 is welded to the right front bracket 13A in a state where a plate surface of the flange portion 182 is stacked on a plate surface of the right front bracket 13A. In other words, the coupling member 18 is directly welded and fixed to the right front bracket 13A at the flange portion 182.

The flange 19 serves a function similar to that of the flange portion 182. The coupling member 18 is fixed to the right front bracket 13A and the right side frame 12A in a state of penetrating the right front bracket 13A and the right side frame 12A.

If a flange portion is provided at each of the one end and the other end of the coupling member 18, then one of the flange portions becomes an obstacle, and an assembly worker cannot insert the coupling member 18 through the right front bracket 13A and the right side frame 12A.

Accordingly, in the first embodiment, a flange portion to be provided at the one end of the coupling member 18, that is, the flange 19 is configured as a component separate from the cylindrical portion 181. The assembly worker inserts the coupling member 18 through the right front bracket 13A and the right side frame 12A, and subsequently welds and fixes the flange 19 to the coupling member 18 and the right side frame 12A.

<Details of Coupling Structure (Welding Position)>

Figure 5:
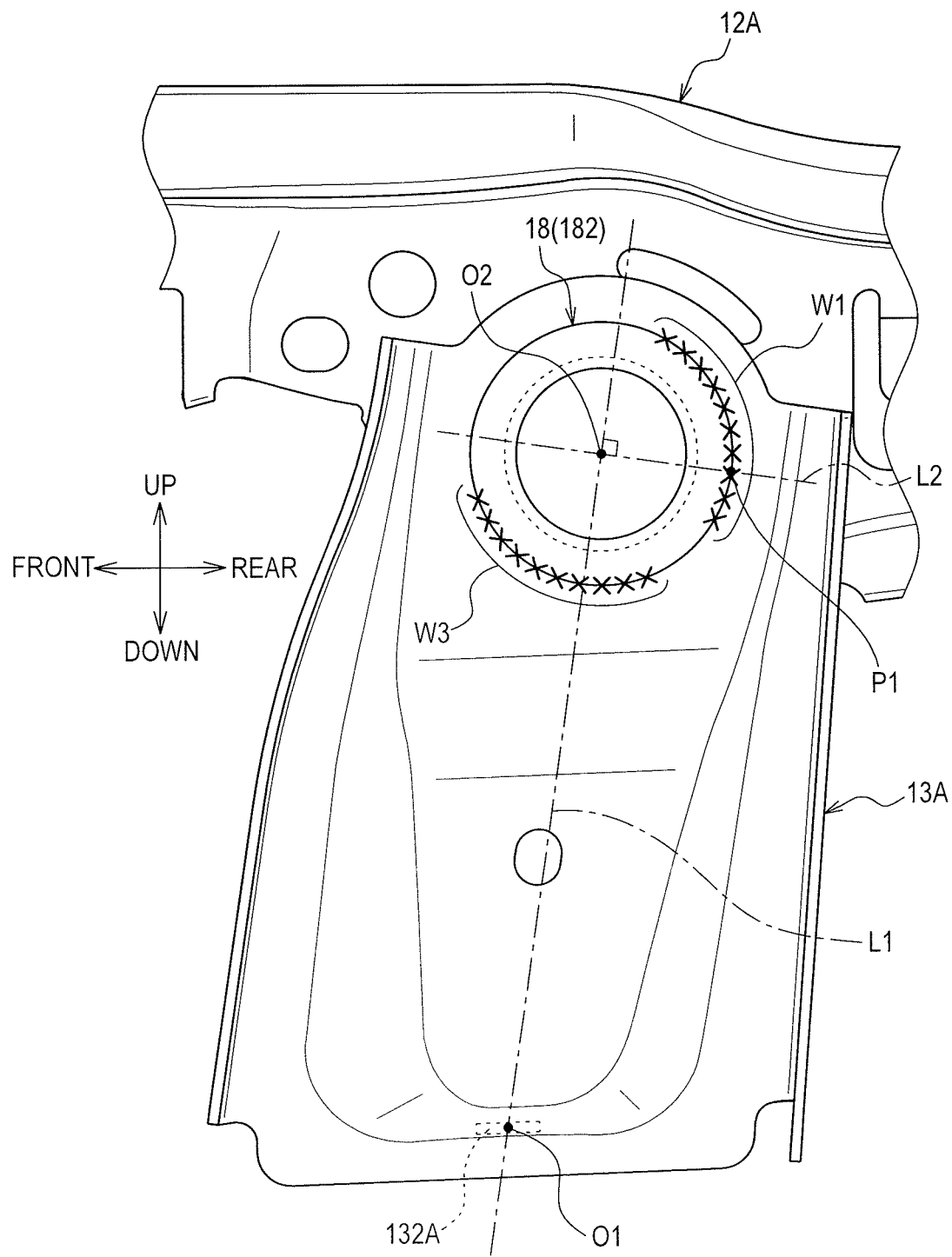
FIG. 5 is an elevational view showing a position of a bracket welding region in the first embodiment.
Figure 6:
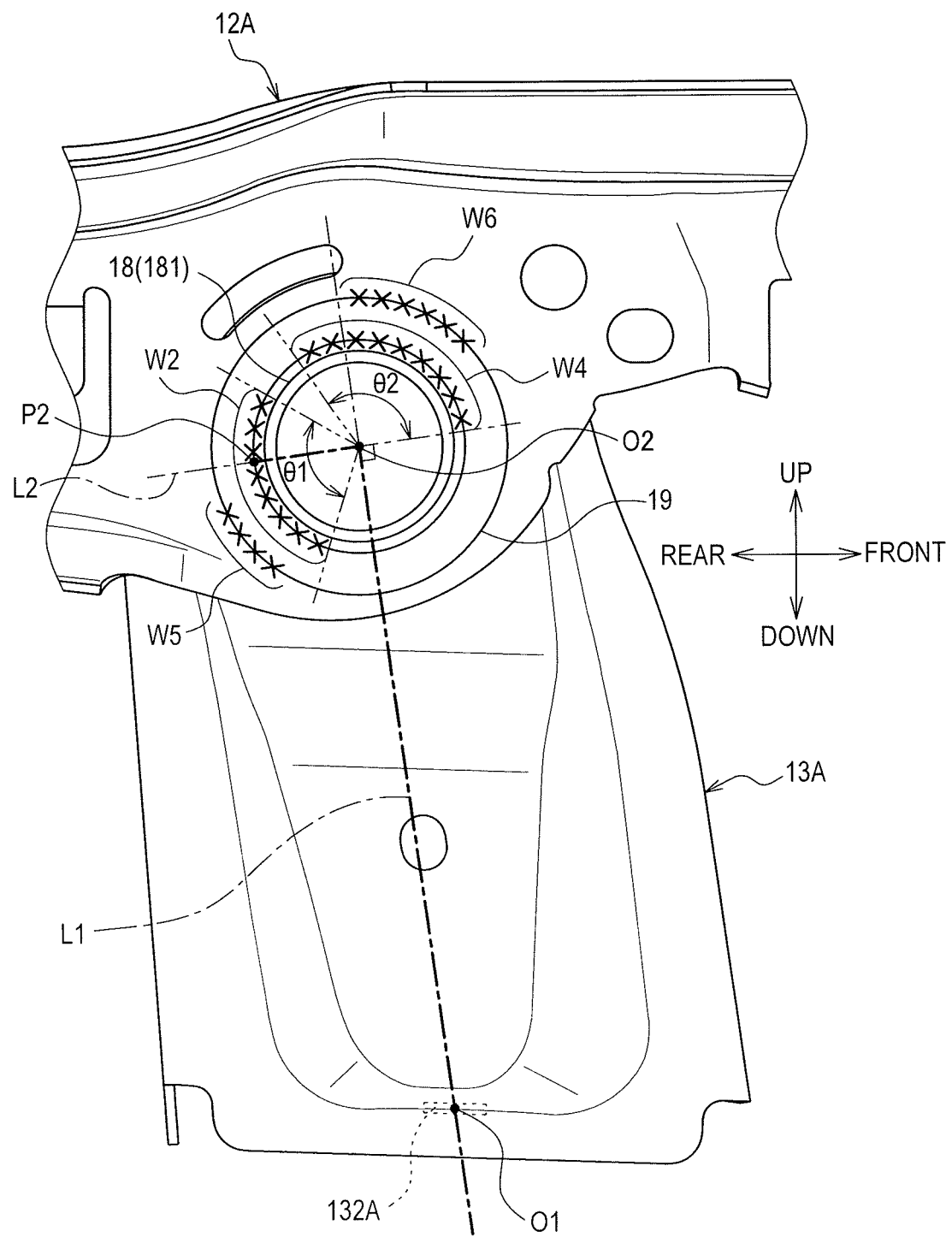
FIG. 6 is an elevational view showing a position of a frame welding region in the first embodiment.

As shown in FIG. 5, a bracket welding region W1 of the coupling member 18, when projected on a virtual plane orthogonal to the seat width direction, extends along an outer periphery of the coupling member 18, in a specified area including an intersection P1 between the outer periphery of the coupling member 18 projected on the virtual plane and a bracket normal line L2. As shown in FIG. 6, a frame welding region W2 of the coupling member 18, when projected on a virtual plane orthogonal to the seat width direction, extends along an outer periphery of the coupling member 18, in a specified area including an intersection P2 between the outer periphery of the coupling member 18 projected on the virtual plane and the bracket normal line L2.

In the first embodiment, a paper plane of each of FIG. 5 and FIG. 6 corresponds to the aforementioned virtual plane. The bracket normal line L2 of the right front bracket 13A is a normal line relative to a bracket center line L1 of the right front bracket 13A and passes through a center O2 of the coupling member 18 projected on the virtual plane. The bracket center line L1 of the right front bracket 13A is a virtual line that passes through a center O1 of the right front fixing portion 131A projected on the virtual plane and through the center O2 of the coupling member 18 projected on the virtual plane.

The center O1 of the right front fixing portion 131A in the first embodiment is a point that is positioned in the through hole 132A and on a center axis of the through hole 132A. The center O2 of the coupling member 18 is a sectional center of the coupling member 18, that is, a point at which a sectional primary moment on a cross section of the coupling member 18 is zero.

Specifically, as shown in FIG. 5, the bracket welding region $W_1$ extends in an arc shape along an outer periphery of the flange portion 182 in a specified area including the intersection P1 between the outer periphery of the flange portion 182 and the bracket normal line L2.

As shown in FIG. 4, the bracket welding region W1 in the first embodiment is provided on an opposite side (the left side in the first embodiment) of the right front bracket 13A relative to the right side frame 12A. In other words, the bracket welding region W1 is provided on a side of the right front bracket 13A along the seat width direction different from a side facing a space A1 located between the right side frame 12A and the right front bracket 13A.

As shown in FIG. 6, the frame welding region W2 extends in an arc shape along an outer periphery of the cylindrical portion 181 in a specified area including the intersection P2 between the outer periphery of the cylindrical portion 181 and the bracket normal line L2.

As shown in FIG. 4, the frame welding region W2 in the first embodiment is provided on an opposite side of the flange 19 (the right side in the first embodiment) relative to the right front bracket 13A. The flange 19, which is welded and fixed to the right side frame 12A, may be regarded as a part of the right side frame 12A.

Accordingly, in other words, the frame welding region W2 is provided on an opposite side of the right side frame 12A relative to the right front bracket 13A along the seat width direction. That is, the frame welding region W2 is provided on a side of the right side frame 12A different from a side facing the space A1.

A welding region W3 shown in FIG. 5 is a welding region of the coupling member 18 (the flange portion 182) and the right front bracket 13A. In the first embodiment, a required weld strength is ensured by the welding region W3 and the bracket welding region W1.

A welding region W4 shown in FIG. 6 is a welding region of the coupling member 18 (the cylindrical portion 181) and the right side frame 12A (the flange 19). In the first embodiment, a required weld strength is ensured by the welding region W4 and the frame welding region W2.

Welding regions W5, W6 are each a welding region of the right side frame 12A and the flange 19. At least a part of the welding region W5 is positioned within an angle range θ1, in which the frame welding region W2 is provided, around the center O2 of the coupling member 18. At least a part of the welding region W6 is positioned within an angle range θ2, in which the welding region W4 is provided, around the center O2 of the coupling member 18.

3. Features of Vehicle Seat (Particularly, Cushion Frame) in First Embodiment

As shown in FIG. 4, the coupling member 18 fixes the upper end portion of the right front bracket 13A to the right side frame 12A, while holding the upper end portion at a position offset relative to the right side frame 12A in the seat width direction.

As a result, if a load in the seat front-rear direction (hereinafter, a "front-rear load") is applied to the right side frame 12A, a load (hereinafter referred to as a "parallel load") parallel to the front-rear load is applied to the upper end portion of the right front bracket 13A through the coupling member 18, and also a moment (rotational force) to twist the right front bracket 13A is applied to the upper end portion of the right front bracket 13A through the coupling member 18.

Thus, at least a part of energy of the load applied to the right side frame 12A is absorbed as deformation of the right front bracket 13A by the parallel load, as deformation of the right front bracket 13A by the moment, and the like.

In other words, at least a part of the energy of the load applied to the right side frame 12A may be absorbed by the right front bracket 13A through a plurality of deformation modes. Accordingly, the energy of the load applied to the right side frame 12A is inhibited from being concentrated on a specific area, and thus, stress concentration can be reduced.

As described above, the bracket welding region W1 is provided on the opposite side of the right front bracket 13A relative to the right side frame 12A, improving welding workability.

If the bracket welding region W1 is provided in the space A1, then a welding worker is required to insert a welding torch or the like into the space A1 during welding operation. Since the space A1 is generally narrow, the right side frame 12A becomes an obstacle that prevents the welding worker from inserting the welding torch into the space A1 or radiating a laser beam to the space A1.

In contrast, in the first embodiment, the bracket welding region W1 is provided on the opposite side of the right front bracket 13A relative to the right side frame 12A. With this configuration, the welding worker is not required to insert a welding torch into the space A1 or to radiate a laser beam to the space A1. Accordingly, welding workability can be improved.

The frame welding region W2 is provided on the opposite side of the right side frame 12A (the flange 19) relative to the right front bracket 13A. With this configuration, welding workability can be improved for the same reason as in the case of the bracket welding region W1.

Second Embodiment

Next, a second embodiment of the present disclosure will be described.

The above-described moment that is caused in the upper end portion of the right front bracket 13A when a load in the seat front-rear direction is applied to the right side frame 12A is a moment (rotational force) that twists the right front bracket 13A; thus, a deformation mode that can cause coming off of the coupling member 18 from the right front bracket 13A and the right side frame 12A can occur.

Figure 7:
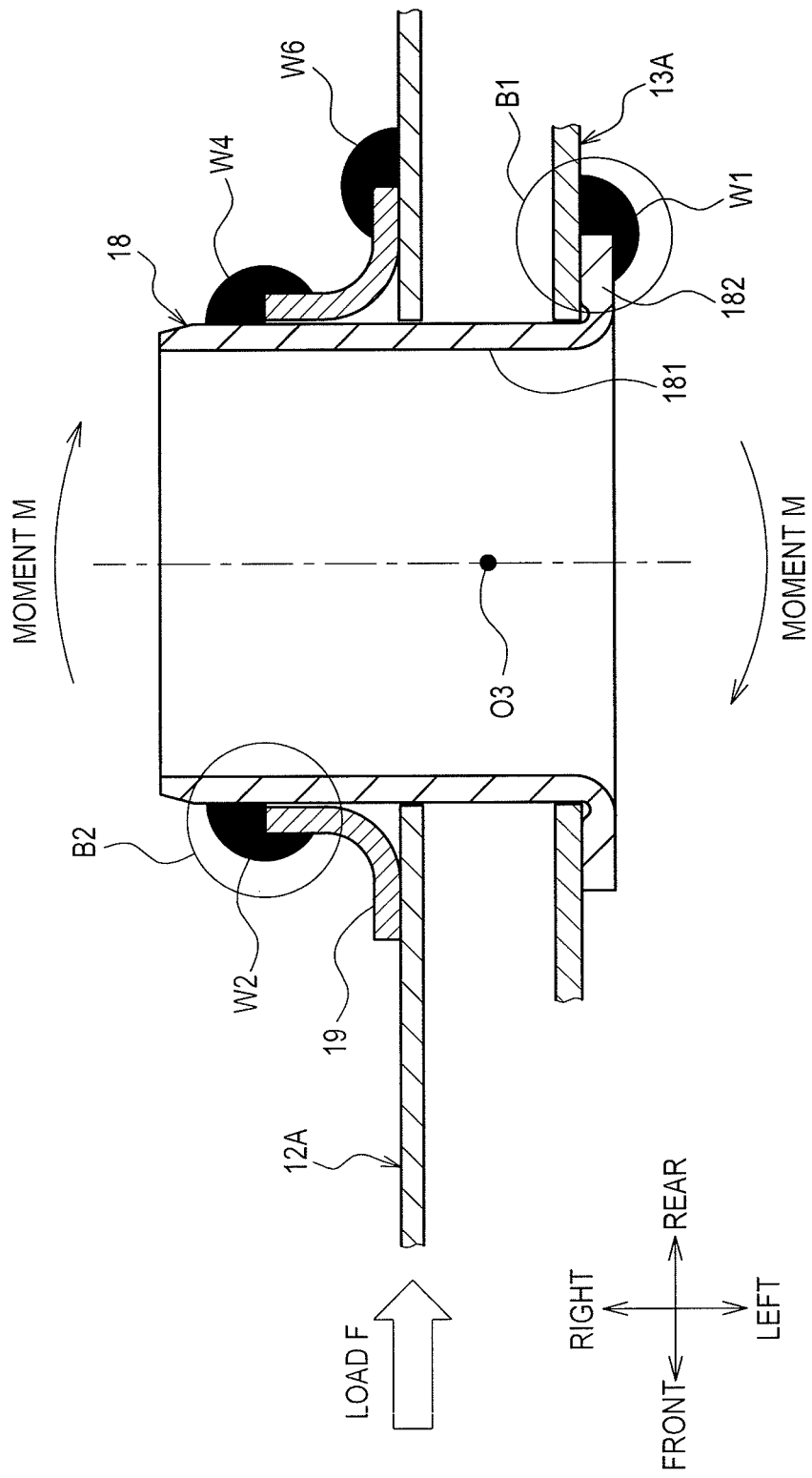
FIG. 7 is an explanatory view of features of a coupling structure of a right side frame and a right front bracket in a second embodiment.

For example, if a load F is applied to the right side frame 12A from the front, as shown in FIG. 7, then the load F generates a moment M to twist the coupling member 18 around a moment center O3. The moment center O3 is located at a position substantially bisecting a distance between the right front bracket 13A and the right side frame 12A along a center axis of the coupling member 18.

The moment M causes a force in a direction for detaching a portion of the coupling member 18 in an area B1 from the right front bracket 13A and a force in a direction for detaching a portion of the coupling member 18 in an area B2 from the right side frame 12A (the flange 19).

In contrast, the bracket welding region W1 of the second embodiment is provided to extend in an arc shape along an outer periphery of a flange portion 182 in a specified area including the intersection P1 between the outer periphery of the flange portion 182 and the bracket normal line L2 in the position corresponding to the portion of the coupling member 18 in the area B1 as shown in FIG. 7.

Also, the frame welding region W2 of the second embodiment is provided to extend in an arc shape along the outer periphery of the cylindrical portion 181 in the specified area including the intersection P2 between the outer periphery of the cylindrical portion 181 and the bracket normal line L2 in the position corresponding to the portion of the coupling member 18 in the area B2 as shown in FIG. 7.

The moment M generally creates a rotational force around the bracket center line L1. Thus, the welding regions W1, W2 provided in the above-described specified areas can achieve a joining structure that may effectively resist the deformation mode.

The right front fixing portion 131A comprises a through hole 132B to insert a fixing bolt. This enables rotation of the entire right front bracket 13A when the moment M acts thereon. Accordingly, the energy of the load may be absorbed also by the rotation, and thus, an excessive increase in torsional stress by the moment M can be inhibited.

Other Embodiments

The right front fixing portion 131A in the above-described embodiments comprises one through hole 132B through which a fixing bolt is inserted. The present disclosure is not limited to this configuration. For example, in a case where there are a plurality of fixing bolts, a plurality of through holes 132A, through which the respective fixing bolts pass, may be formed in the right front fixing portion 131A.

With the plurality of through holes 132A, "the center O1 of the right front fixing portion 131A" is, for example, a point at which a torsional shearing stress generated at a lower end of the right front bracket 13A is approximately zero, that is a neutral point of twisting, when the moment M acts on the right front bracket 13A.

In other words, a point at which the sum of moments caused by axial forces generated in a plurality of bolts is zero is the center O1 of the right front fixing portion 131A. Accordingly, for example, if the right front bracket 13A is fixed with two bolts, then the center O1 of the right front fixing portion 131A is a point bisecting the distance between the respective centers of the two bolts.

The right front fixing portion 131A in the above-described embodiments is configured to use a mechanical fastener, such as a bolt. The present disclosure is not limited to such configuration. For example, the right front fixing portion 131A may be configured by welding. If the right front bracket 13A is welded to the right movable rail 11A, then the center O1 of the right front fixing portion 131A is a point at which the torsional shearing stress is approximately zero in the welding region.

In the above-described embodiments, the flange portion 182 is formed integrally with the cylindrical portion 181, and the flange 19 is formed as a member separate from the cylindrical portion 181 and is then integrated with the cylindrical portion 181 by welding. The present disclosure is not limited to this configuration.

For example, following configurations may be employed: (a) the flange 19 is formed integrally with the cylindrical portion 181, and the flange portion 182 is formed as a member separate from the cylindrical portion 181 and is then integrated with the cylindrical portion 181 by welding; or (b) neither the flange portion 182 nor the flange 19 is provided, and the cylindrical portion 181 is directly welded and fixed to the right front bracket 13A and the right side frame 12A.

In the above-described embodiments, the coupling member 18 is not welded over the entire periphery thereof to the right front bracket 13A and the right side frame 12A. The present disclosure is not limited to this configuration. For example, the coupling member 18, that is, at least one of the cylindrical portion 181 or the flange portion 182, may be welded over the entire periphery thereof to the right front bracket 13A and the right side frame 12A.

In the above-described embodiments, the bracket welding region W1 is provided on the opposite side of the right front bracket 13A relative to the right side frame 12A. The present disclosure is not limited to this configuration. For example, the bracket welding region W1 may be provided on the same side of the right front bracket 13A as the right side frame 12A.

Also in this case, the bracket welding region W1 may preferably extend in an arc shape along the outer periphery of the flange portion 182 in a specified area including the intersection between the outer periphery of the cylindrical portion 181 and the bracket normal line L2.

In the above-described embodiments, the frame welding region W2 is provided on the opposite side of the right side frame 12A (the flange 19) relative to the right front bracket 13A. The present disclosure is not limited to this configuration. For example, the frame welding region W2 may be provided on the same side of the right side frame 12A (the flange 19) as the right front bracket 13A.

Also in this case, the frame welding region W2 may preferably extend in an arc shape along the outer periphery of the cylindrical portion 181 in a specified area including the intersection between the outer periphery of the cylindrical portion 181 and the bracket normal line L2.

In the above-described embodiments, each of the bracket welding region W1 and the frame welding region W2 extends in an arc shape along the outer periphery of the coupling member 18 in the specified area including the intersection between the outer periphery of the coupling member 18 and the bracket normal line L2.

The present disclosure is not limited to this configuration. For example, only one of the bracket welding region W1 and the frame welding region W2 may be provided in the specified area.

In the above-described embodiments, the coupling member 18 is configured with a collar member, which is a member separate from the coupling rod 15. The present disclosure is not limited to this configuration. For example, the coupling member 18 may be configured with the coupling rod 15.

In FIG. 4 of the above-described embodiment, the right front bracket 13A is offset leftward from the right side frame 12A. The present disclosure is not limited to this configuration. For example, the right front bracket 13A may be offset rightward from the right side frame 12A.

In the above-described embodiments, the vehicle seat of the present disclosure is applied to a vehicle. The present disclosure is not limited to this, but may be applied to a seat for use in any vehicles, such as railway vehicles, ships and boats, and aircrafts, and to an installed seat for use in theaters or households.

Further, the present disclosure is not limited to the above-described embodiments, but may be embodied in various forms within the scope of the invention defined by the appended claims. Accordingly, it may be possible to employ a configuration obtained by combining at least two embodiments among the above-described embodiments.

What is claimed is:

1. A cushion frame for use in a vehicle seat, the cushion frame comprising:
   a side frame extending in a seat front-rear direction;
   a bracket supporting the side frame and comprising a lower end portion having a fixing portion to be fixed to a vehicle directly or indirectly; and
   a coupling member fixed to an upper end portion of the bracket and configured to hold the upper end portion at a position offset in a seat width direction relative to the side frame and to fix the upper end portion to the side frame,
   wherein a welding region of the coupling member, projected on a virtual plane orthogonal to the seat width direction, extends along an outer periphery of the coupling member in a specified area including an intersection between the outer periphery of the coupling member projected on the virtual plane and a bracket normal line, and wherein the bracket normal line is a normal line of a bracket center line and passes through a center of the coupling member projected on the virtual plane, and the bracket center line is a virtual line that passes through a center of the fixing portion projected on the virtual plane and through the center of the coupling member projected on the virtual plane.

2. The cushion frame of claim 1, wherein the fixing portion comprises a member having a through hole, through which a fixing bolt is inserted, or comprises a fixing bolt.

3. The cushion frame of claim 1,
wherein the welding region is a region to be welded to fix the coupling member to the bracket, and
wherein the welding region is provided on an opposite side of the bracket relative to the side frame.

4. The cushion frame of claim 1,
wherein the welding region is a region to be welded to fix the coupling member to the side frame, and
wherein the welding region is provided on an opposite side of the side frame relative to the bracket.

5. A cushion frame for use in a vehicle seat, the cushion frame comprising:
a flange;
a side frame;
a bracket including a fixing portion located at a bottom end of the bracket; and
a coupling member including:
a cylindrical portion including a central axis,
a flange portion; and
welding regions,
wherein the side frame and the bracket are separated by a first space,
wherein the flange portion is adjacent to a surface of the bracket and is not located in the first space,
wherein the flange is adjacent to a surface of the side frame and is not located in the first space,
wherein a virtual plane passes substantially vertically through the bracket and includes:
a first center located in the fixing portion,
a second center located on the central axis,
a bracket center line connecting the first center and the second center, wherein the bracket center line has a upward portion located above the second center and has a downward portion located below the second center, and
a bracket normal line intersecting the second center and perpendicular to the bracket center line, wherein the bracket normal line has a front portion located in front of the second center and has a rear portion located in rear of the second center, and
wherein the welding regions include:
a first welding region welding a periphery of the flange portion to the bracket, and
a second welding region welding an inside edge of the flange to an outer surface of the cylindrical portion.

6. The cushion frame of claim 5,
wherein the first welding region, when projected onto the virtual plane, intersects the rear portion of the bracket normal line, and does not intersect the bracket center line, and
wherein the second welding region, when projected onto the virtual plane, intersects the rear portion of the bracket normal line, and does not intersect the bracket center line.

7. The cushion frame of claim 5,
wherein the first welding region is located substantially opposite to the second welding region relative to the central axis of the cylindrical portion when projected on the virtual plane.

8. The cushion frame of claim 5,
wherein the welding regions further include:
a third welding region further welding the periphery of the flange portion to the bracket,
wherein the third welding region, when projected on the virtual plane, intersects the downward portion of the bracket center line and does not intersect the bracket normal line, and
wherein the third welding region is separated from the first welding region by unwelded portions of the periphery of the flange portion.

9. The cushion frame of claim 8,
wherein the first welding region, when projected onto the virtual plane, intersects the rear portion of the bracket normal line, and does not intersect the bracket center line, and
wherein the third welding region, when projected onto the virtual plane, intersects the downward portion of the bracket center line, and does not intersect the bracket normal line.

10. The cushion frame of claim 9,
wherein the first welding region includes approximately 90 degrees of the periphery of the flange portion, and
wherein the third welding region includes approximately 90 degrees of the periphery of the flange portion.

11. The cushion frame of claim 8,
wherein the welding regions further include:
a fourth welding region further welding the inside edge of the flange to the outer surface of the cylindrical portion, and not contacting the second welding region,
a fifth welding region welding a periphery of the flange to a surface of the side frame, and
a sixth welding region further welding the periphery of the flange to the surface of the side frame, and not contacting the fifth welding region,
wherein the fourth welding region, when projected on the virtual plane, intersects the upward portion of the bracket center line and does not intersect the rear portion of the bracket normal line,
wherein the fifth welding region, when projected on the virtual plane, is located between the downward portion of the bracket center line and the rear portion of the bracket normal line,
wherein the sixth welding region is located between the upper portion of the bracket center line and the front portion of the bracket normal line.

12. The cushion frame of claim 11,
wherein the second welding region defines a first angle range relative to the central axis and intersects the bracket normal line when projected on the virtual plane, and
wherein the fourth welding region defines a second angle range relative to the central axis and intersects the bracket normal line when projected on the virtual plane.

13. The cushion frame of claim 12,
wherein the first angle range is approximately 90 degrees and does not intersect the bracket center line when projected onto the virtual plane,
wherein the second angle range is greater than 90 degrees,
wherein the fifth welding region is located within the first angle range when projected onto the virtual plane, and wherein the sixth welding region is located within the second angle range wherein projected onto the virtual plane.

14. The cushion frame of claim 13,
wherein the first welding region has a third angle range of approximately 90 degrees, and
wherein the third welding region has a fourth angle range of approximately 90 degrees.

15. The cushion frame of claim 5,
wherein the welding regions further include:
   a third welding region further welding the periphery of the flange portion to the bracket, and not contacting the first welding region,
   a fourth welding region further welding the inside edge of the flange to the outer surface of the cylindrical portion, and not contacting the second welding region,
   a fifth welding region welding a periphery of the flange to a surface of the side frame, and
   a sixth welding region further welding the periphery of the flange to the surface of the side frame, and not contacting the fifth welding region, and
wherein a horizontal plane intersecting the central axis:
   intersects the first welding region,
   intersects the second welding region,
   does not intersect the third welding region,
   intersects the fourth welding region,
   does not intersect the fifth welding region, and
   intersects the sixth welding region.

* * * * *